United States Patent Office 3,692,696
Patented Sept. 19, 1972

3,692,696
CATALYST FOR HYDROCARBON CONVERSION
Stanley Kravitz, Wiccopee, and John H. Estes and Robert M. Suggitt, Wappingers Falls, N.Y., assignors to Texaco, Inc., New York, N.Y.
No Drawing. Filed June 25, 1970, Ser. No. 49,898
Int. Cl. B01j 11/78
U.S. Cl. 252—439                                14 Claims

ABSTRACT OF THE DISCLOSURE

A method for preparing a hydrocarbon conversion catalyst by providing a composite composed of alumina having associated therewith a Group VI-B, VII-B or VIII metal or compound and contacting the composite with an activator system comprising carbon monoxide and sulfur hexafluoride. The catalysts so prepared are useful in such hydrocarbon conversion processes as isomerization, hydrocracking, reforming, alkylation, disproportionation, polymerization and hydrogenation.

BACKGROUND OF THE INVENTION

This invention relates to the preparation of fluorine containing catalysts and to their use in low temperature hydrocarbon conversion processes. In one of its specific aspects, this invention relates to a method of preparing a catalyst comprising a member of Group VI-B, VII-B or VIII of the Periodic Table, alumina and fluorine which is suitable for the conversion of hydrocarbons.

Fluorided catalysts are of interest for various processes including isomerization, reforming, alkylation, hydrogenation, disproportionation, cracking, polymerization and hydrocracking. Heretofore, activation of catalyst bases or composites by fluoriding was undertaken employing aqueous hydrogen fluoride or vaporized boron or ammonium fluorides. Such fluoriding techniques, however, by virtue of the fluoriding materials employed introduced various problems not the least of which included health, handling and equipment corrosion. In some instances unwanted surface deposits resulted from the treatment which interferred with the catalyst's ability to function. Moreover, such fluoriding techniques did not lend themselves to the replacement of fluorine lost during high temperature regeneration. Recently, other fluoriding compounds have been suggested such as carbon tetrafluoride and sulfur tetrafluoride. However, these materials in addition to their costliness present physiological difficultes.

It is therefore an object of this invention to provide a method for catalytically activating a composite material employing as a component of the activator system a fluoriding agent that introduces no equipment corrosion problems.

Another object of this invention is to provide a method for fluoriding catalysts with an agent that is physiologically inert.

Yet another object of this invention is to provide a method for fluoriding catalysts with a fluoriding system employing as fluoriding agent a material heretofore considered inert.

Still another object of this invention is to provide a hydrocarbon conversion process undertaken in the presence of a catalyst prepared or regenerated in situ under non-corrosive conditions in a hydrocarbon conversion reactor.

Other objects and advantages will become apparent from a reading of the following detailed description and examples.

SUMMARY OF THE INVENTION

Broadly, this invention contemplates a method of preparing a catalyst comprising a hydrogenating component, alumina and from about 0.5 to 15.0 weight percent fluorine which comprises contacting alumina having associated therewith a hydrogenating component selected from the group consisting of metals of Groups VI-B, VII-B and VIII of the Periodic Table, their compounds and mixtures thereof with a combination of carbon monoxide and sulfur hexafluoride at a temperature of from about 200 to 1200° F.

According to our invention, catalytically active fluoride catalysts can be prepared employing sulfur hexafluoride, a compound heretofore considered chemically inert. It has been found that this compound is rendered chemically reactive in the presence of a hydrogenating component comprising the metals and compounds of Groups VI-B, VII-B and VIII and carbon monoxide such that an alumina composite can be activated and provided with a chemically combined fluorine content of from about 0.5 to 15.0, preferably 0.5 to 6.0 weight percent based on the catalyst. Catalytic activation under the conditions described herein is surprising inasmuch as carbon monoxide has long been considered as a strong poison towards Group VIII metal catalysts and particularly platinum catalysts.

The highly active hydrocarbon conversion catalysts contemplated herein are prepared from an alumina composite activated with a combination of carbon monoxide and sulfur hexafluoride. As mentioned above, the alumina has associated therewith as a component of the composite a member selected from the group of metals of Groups VI-B, VII-B and VIII of the Periodic Table exemplified by chromium, molybdenum, tungsten, rhenium, cobalt, nickel, platinum, palladium, ruthenium and rhodium. Combinations of metals are also contemplated such as platinum-rhenium, nickel-tungsten and cobalt-molybdenum. The member may be present on the catalyst as metal or as a compound such as the oxide, sulfide or salt such as the sulfate. Preferably we employ a member having hydrogenating activity such as the metals of Group VIII and we particularly prefer platinum and palladium. In general, the catalyst may contain a member of Groups VI-B, VII-B or VIII in amounts of from 0.01 to 30 weight percent calculated as weight of metal. When Group VIII members such as platinum, palladium, rhodium and ruthenium are employed as composite components we preferably employ from 0.1 to 2.0 weight percent. Combinations of metals such as nickel and tungsten are employed in greater amounts as for example 20 to 30 weight percent.

Aluminas in various forms may be used in this invention and particularly those aluminas having replaceable surface hydroxyl groups and surface areas of 50 to 800 square meters per gram using the BET method. Included within our definition of alumina, we mention for example eta-alumina, gamma-alumina, silica-stabilized alumina, i.e., aluminas containing approximately 5 weight percent $SiO_2$, thoria-alumina, zirconia-alumina, titania-alumina and chromia-alumina. Also contemplated are silica-aluminas having surface areas of from 100 to 600 square meters per gram and aluminosilicates having surface areas of from 600 to 800 square meters per gram. Preferably we employ aluminas having surface areas of from 50 to 400 square meters per gram and particularly eta- and gamma-alumina. Suitable composites contemplated for contacting with our fluoriding system include commercially available materials including platinum-alumina and platinum-rhenium-alumina reforming catalysts, chrome-alumina dehydrogenation catalysts and nickel-tungsten-alumina, nickel-tungsten-silica-alumina hydrogenation catalysts. The composites are prepared by techniques well known to the art. Illustratively, a metal, such as platinum, is provided to the composite by impregnating active alumina with an aqueous solution of chloroplatinic acid and ethylene diamine followed by drying and calcining at about 1050° F. for 2 hours thereby providing a platinized alumina composite. Where palladium is contemplated, it may similarly be introduced by providing a palladium tetramine complex as by dissolving palladium chloride in hydrochloric acid, diluting with water and concentrated ammonium hydroxide followed by heating at 140° F. with stirring for about 30 minutes until the precipitate originally formed is dissolved. The resulting solution is cooled and added to the alumina and after thorough mixing the alumina is dried at about 300° F. and thereafter calcined at elevated temperatures of from 800 to 1200° F. for periods of at least 2 hours. Nickel oxide on alumina can be prepared by adding an aqueous solution of nickel nitrate to alumina at temperatures of from 80 to 200° F. and calcining the dried composite at 800° F. In a similar manner, Group VI-B and VII-B members are provided to the composite by impregnation with soluble salts of these metals, followed by calcination at 600 to 1200° F. for several hours.

In accordance with our invention, a composite as hereinabove defined in contacted with a combination of carbon monoxide sulfur hexafluoride to introduce to the final catalyst about 0.5 to 15.0 weight percent chemically combined fluoride. Flouriding in accordance with this invention enhances the acidity of the treated composite thereby promoting the catalyst's activity and improving its selectivity. Moreover, fluoriding provides the catalyst with activity at lower temperatures where the unfluorided composite would be inactive.

The mole ratio of carbon monoxide to fluoride compound during the contacting stage can vary from 0.1 to 100 moles of carbon monoxide per mole of fluoride compound and preferably within the range of 1 to 10 moles of carbon monoxide per mole of fluoride compound. Mole ratios of carbon monoxide less than 0.1:1 are undesirable because there is inefficient utilization of the fluoride compound and ratios above 100:1 are unnecessary because this greatly exceeds the optimum requirements of carbon monoxide consumption. The activating combination of carbon monoxide and sulfur hexafluoride may be introduced to the composite separately or as mixed gaseous streams and the gaseous activator components are permitted to flow through and oved the composite. During contacting, the composite is generally maintained at a temperature of from 200 to 1200° F. and preferably at a temperature of from about 600 to 900° F. Depending on the activating temperature employed and the weight percent fluorine to be introduced to the composite, contact times ranging from one-half to twenty-four hours are employed. In view of the non-corrosive nature of sulfur hexafluoride, the catalyst can be prepared in situ in a hydrocarbon conversion reactor by passing a stream of carbon monoxide and the fluoride compound to the vessel directly containing the composite. The effluent from the reactor during activation contains hydrogen sulfide, water and unreacted components and activation can be considered essentially complete when no further hydrogen sulfide is detectable in the effluent. In general, hydrogen sulfide cessation indicates a fluorine content of about 4 weight percent. However, fluoriding may be terminated prior to cessation of hydrogen sulfide evolution to provide fluoride contents as low as 0.5 weight percent or fluoriding may be continued past this point so as to provide the catalyst with a fluorine content of up to at least 15.0 weight percent, and preferably up to 6.0 weight percent.

As mentioned above, the composite is contacted with a combination of carbon monoxide and sulfide hexafluoride. In the absence of the aforementioned Group VI-B, VII-B and VIII members as a component of the composite the fluoride compound is chemically inactive, particularly at temperatures of 900° F. and below, and the alumina is merely provided with adsorbed sulfur hexafluoride and not chemically combined fluorine. Merely adsorbing the compound onto the composite does not provide or promote activity nor improve selectivity. Unexpectedly, composites of alumina associated with a Group VI-B, VII-B or VIII metal as described above when contacted with a combination of carbon monoxide and sulfur hexafluoride in some manner unknown to applicants permits reaction between the heretofore considered inert fluoride compound and the composite such that chemically combined fluorine is introduced to the composite thereby providing the contemplated catalytically active material. Contacting as set out above is broadly undertaken at a temperature of at least 200 and up to 1200° F. Preferably, initial contacting of the composite, carbon monoxide and fluoride compound is contacted at temperatures of at least 450° F. thereby initiating rapid fluoriding of the composite. Upon reaching a fluoride content of about 0.5 weight percent, subsequent contacting temperatures as low as 200° F. can be employed. However, at the lower temperatures the reaction is slow and results in inefficient use of fluoride compound. Initial or subsequent contact temperatures below 200° F. are generally insufficient to provide adequate reaction rates or highly active catalysts useful for commercial size operations in that fluoride levels of less than 0.5 weight percent result. In our highly preferred embodiment all contacting is conducted at temperatures of from about 600 to 900° F.

As contemplated herein, the inventive concept includes both initial activation and subsequent regeneration of the fluorided catalysts. It will be appreciated that during the course of hydrocarbon conversion, feedstocks employed may in some instances contain materials such as combined nitrogen in amounts exceeding 30 p.p.m. or such other materials as sulfur or carbonaceous deposits which in the course of operation cause the catalyst to become deactivated. These deactivating materials are removed from the catalyst by a hydrogen strip or a controlled oxidation. The catalyst surface is then exposed to a regenerating procedure by contacting with the combination of carbon monoxide and sulfur hexafluoride in a manner described above.

The catalyst prepared by our invention can be produced in pellet, granular, bead or pulverulent form to facilitate its use in fixed beds, moving beds or fluidized solid beds as is well known in the art. During the course of catalyst activation or regeneration, the effluent from the hydrocarbon conversion reactor consists largely of hydrogen sulfide, water, sulfur dioxide, carbon monoxide and unconverted sulfur hexafluoride. Any unconverted fluoride compound and excess carbon monoxide may be recycled.

The catalyst prepared herein is highly active for hydrocarbon conversion at relatively low temperatures of from 200 to 1000° F. and finds application in a board spectrum of conversion processes including hydrocracking, selective hydrocracking, hydroisomerization, disproportionation, alkylation polymerization, reforming and hydrogenation. In general, the hydrocarbon feedstocks contain less than 30 p.p.m. nitrogen and are converted in the presence of our catalyst at temperatures recited above.

Catalysts prepared according to our invention are admirably suited to convert a wide range of hydrocarbon materials. Illustratively, fluorided platinized aluminas are highly active for hydrocracking and hydroisomerizing such charge materials as waxes, slack wax and middle distillate oils at temperatures of 550 to 800° F., at pressures of 300 to 750 pounds per square inch gauge, liquid hourly space velocities of 1 to 20 and in the presence of hydrogen. In general, catalysts containing lower fluorine contents require the higher conversion temperatures for equivalent rates of reaction. Selectively for isomerization of normal $C_4$ to $C_6$ paraffins is improved at the lower temperatures. Aromatics can be hydrogenated and lubricating oil fractions can be modified to improve viscosity index and pour point. Fluorided aluminas having metal compounds such as the oxides associated therewith, exemplified by chromia and molybdena fluoride aluminas, show substantial activity for disproportionation of aromatics as for example the conversion of toluene to benzene and xylene at 750 to 1000° F. The catalysts are active for alkylation of aromatics and aliphatics and polymerization of olefins at temperatures of 200 to 400° F. and pressures of 300 to 800 p.s.i.g. The fluorided catalysts are active for hydrocarbon conversions at considerably lower temperatures than the no-fluorided composite. For example, fluorided platinized alumina permits isomerization of $C_4$ to $C_6$ n-paraffins at the 600° F. range whereas the non-fluorided composite is inactive at temperatures below 800° F.

In order to more fully illustrate the nature of our invention and manner of practicing the same, the following examples are presented.

Example I 216 grams of a commercially available 0..6 weight percent platinum on eta-alumina reforming catalyst were calcined at 800° F. for one hour. While maintaining the temperature at 800° F., a gaseous stream of sulfur hexafluoride was introduced at the rate of 8 liters per hour together with carbon monoxide at the rate of 32 liters per hour and passed through the catalyst bed. Analysis of the effluent stream showed the presence of hydrogen sulfide. After three hours, 216 grams of catalyst were recovered and upon analysis the catalyst was found to contain 0.29 weight percent sulfur and 5.16 weight percent chemically combined fluorine.

The activity of this catalyst was evaluated by contacting 84 grams of catalyst with a normal paraffin charge stock in the $C_{10}$ to $C_{14}$ range at a liquid hourly space velocity of 1.0, a temperature of 550° F. and 500 p.s.i.g. of hydrogen flowing at 3 cubic feet per hour. Product analysis after 48 hours on stream showed that 11.1 percent was cracked to products below $C_{10}$ and that 32.4 percent was isomerized.

Example II 150 cc. of a sulfided 0.5 weight percent platinum on alumina commercial catalyst were calcined under nitrogen at 600° F. The temperature was lowered to 550° F. and carbon monoxide was passed through the catalyst bed at the rate of 32 liters per hour along with 8 liters per hour of sulfur hexafluoride for one hour. Analysis of the effluent stream detected hydrogen sulfide. Treatment was continued for one hour at 600° F. Upon analysis, the catalytically active material was found to contain 0.36 weight percent sulfur and 1.8 weight percent chemically combined fluorine.

Example III 400 grams of commercially available 0.47 weight percent platinum were mixed with 54 grams of hydrofluoric acid (assay 49.1) dissolved in 500 cc. of distilled water for six hours. The catalyst was thereafter recovered and calcined at 1000° F. for three hours in air flowing at the rate of 4 cubic feet per hour. Analysis found the catalyst to contain 5.7 weight percent fluorine.

Example IV

The catalyst of Examples I and III were evaluated for cracking and isomerization activity employing a $C_{10}$ to $C_{14}$ normal paraffin feedstock. Hydrocarbon conversion was conducted at a temperature of 550° F. 500 p.s.i.g. hydrogen flowing at the rate of 3 cubic feet per hour and a liquid hourly space velocity of 1.0. 82 grams of each catalyst were employed. Product analysis of samples taken between 6 and 12 hours on stream showed that 21.3 percent of the feedstock was cracked to products below $C_{10}$ and 29.8 percent was isomerized with the catalyst of Example I, whereas 72.8 percent was cracked to products below $C_{10}$ and 20.1 percent was isomerized with the catalyst of Example III. Based on the data above, it will be seen that catalysts prepared according to our invention exhibit a higher selectivity towards isomerization than catalysts prepared as in Example III.

From the foregoing, it can be seen that we have provided a significantly useful process for the preparation of a catalyst useful in the conversion of hydrocarbons. Our catalyst is particularly useful in the isomerization of isomerizable hydrocarbons especially paraffinic hydrocarbons in the $C_{10}$ to $C_{14}$ range. Our catalyst can also be used in alkylation processes without varying the manipulative procedures to accommodate the catalyst prepared by our invention. It is seen that our process can be performed in situ, i.e., within the hydrocarbon conversion reactor itself and does not necessitate withdrawal of catalyst from the vessel for transfer to the hydrocarbon conversion reactor with the attendant problem of subjecting the catalyst to moisture. It should be further noted that our process can be performed to regenerate a spent catalyst by first heating the spent catalyst to decarbonize the catalyst and then treating in the manner of our invention. Our process can be performed without the use of expensive chemicals, high pressures or temperatures and is thus suited for commercial operation. Our catalyst can contain any one of the aforementioned metals, for example, platinum, palladium, ruthenium and rhodium depending upon the choice of the particular operator, the availability of the metal, etc. The activation of the catalyst bases containing any of these metals proceeds essentially in the same way of activation of alumina base catalyst containing another metal of the group. Thus the manipulative procedure does not substantially vary from one metal to the other.

The terms and expressions which have been used herein are terms of description and not of limitation as there is no intention in the use of such terms and expressions of excluding any equivalents of the features shown and described or portions thereof as it is recognized that various modifications are possible within the scope of the invention. In addiiton to the specific paraffinic hydrocarbons, other hydrocarbons can be isomerized and our process can be used in other hydrocarbon conversion processes.

We claim:

1. A method of preparing a catalyst comprising a hydrogenating component, alumina and from about 0.5 to 15.0 weight percent fluorine which comprises contacting alumina having associated therewith a hydrogenating component selected from the group consisting of the metals, oxides, sulfides and salts of the metals of Groups VI–B, VII–B and VIII of the Periodic Table and mixtures thereof with a combination of carbon monoxide and sulfur hexafluoride at a temperature of from about 200 to 1200° F.

2. A method according to claim 1 wherein said hydrogenating component is present in said catalyst in an amount of from 0.01 to 30.0 weight percent calculated as weight of metal.

3. A method according to claim 1 wherein said component is selected from the group consisting of platinum, palladium, ruthenium, rhodium, nickel, rhenium, cobalt, molybdenum, chromium and tungsten.

4. A method according to claim 1 wherein said component is selected from the group consisting of platinum, palladium, rhodium and ruthenium and where said component is present in said catalyst in an amount of from 0.1 to 2.0 weight percent.

5. A method according to claim 1 wherein said component comprises platinum and rhenium.

6. A method according to claim 1 wherein the mole ratio of said carbon monoxide to said sulfur hexafluoride is from 0.1:1 to 100:1.

7. A method according to claim 1 wherein the mole ratio of said carbon monoxide to said sulfur hexafluoride is from 1:1 to 10:1.

8. A method according to claim 1 wherein the temperature is from 600 to 900° F.

9. A method according to claim 1 wherein said fluorine is present in an amount of from 0.5 to 6.0 weight percent.

10. A method according to claim 1 wherein said alumina is eta-alumina.

11. A method according to claim 1 wherein said alumina is gamma-alumina.

12. A method according to claim 1 wherein said alumina is an aluminosilicate.

13. A method according to claim 1 wherein said alumina is silica-alumina.

14. A method according to claim 1 wherein said alumina has a surface area of from 50 to 400 square meters per gram.

References Cited

UNITED STATES PATENTS

| 3,444,096 | 5/1969 | Turner et al. | 252—439 X |
|---|---|---|---|
| 3,322,689 | 5/1967 | Giannetti et al. | 252—441 |
| 3,338,843 | 8/1967 | Goble et al. | 252—442 |
| 3,449,237 | 6/1969 | Jacobson et al. | 252—466 PT |
| 3,558,523 | 1/1971 | Rausch | 252—439 |
| 3,576,766 | 4/1971 | Rausch | 252—439 |

PATRICK P. GARVIN, Primary Examiner

U.S. Cl. X.R.

208—111, 112; 252—441, 442; 260—683.75, 683.53, 668 A, 671 C